UNITED STATES PATENT OFFICE.

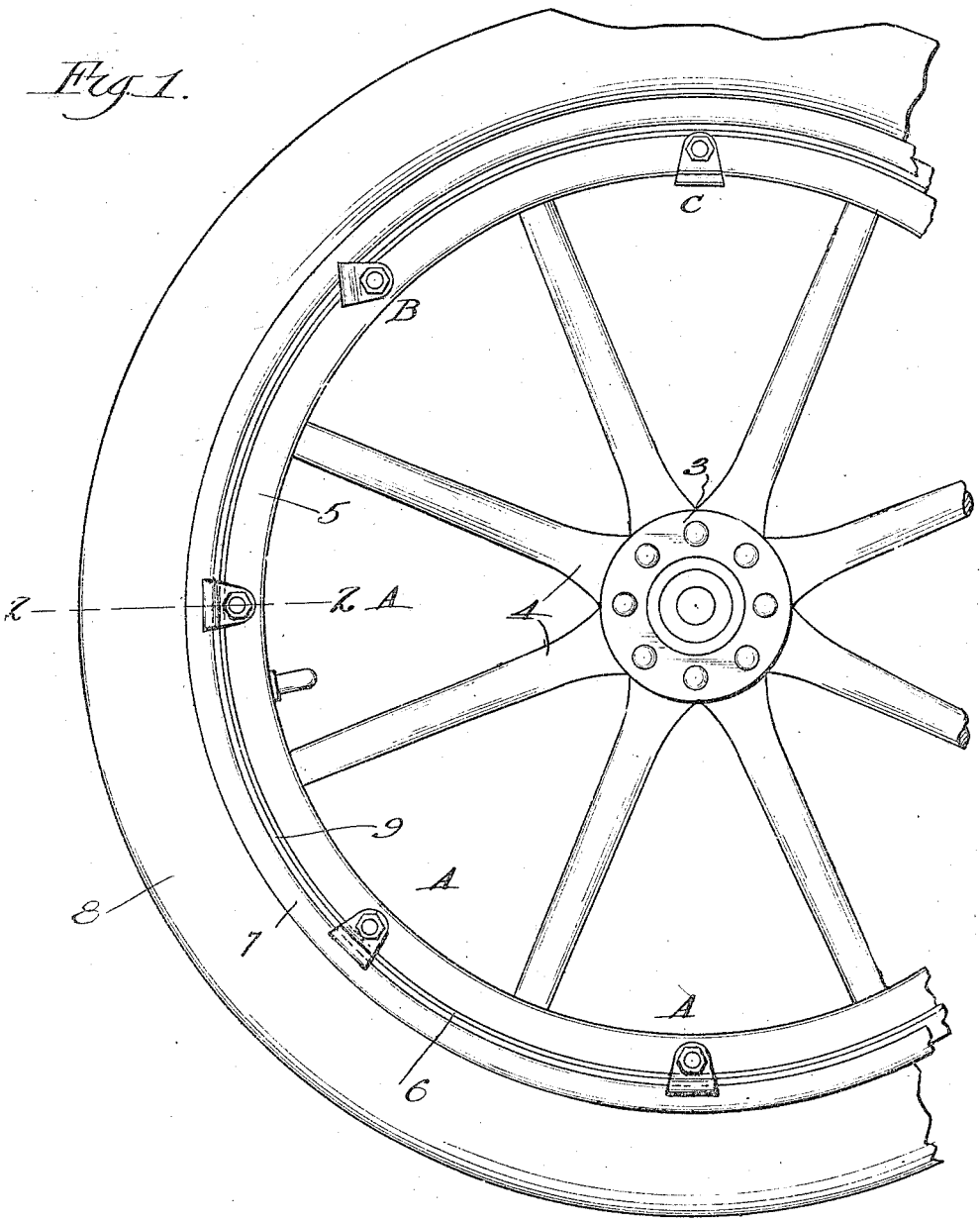

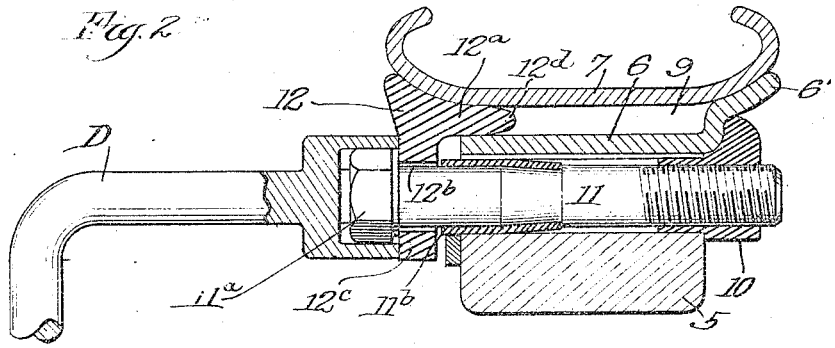
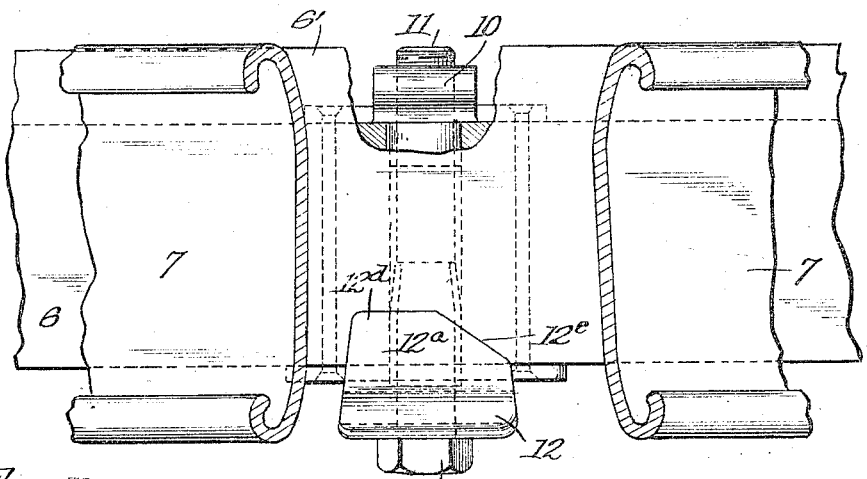
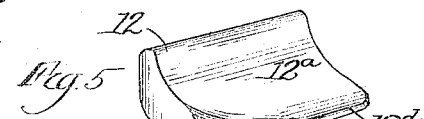
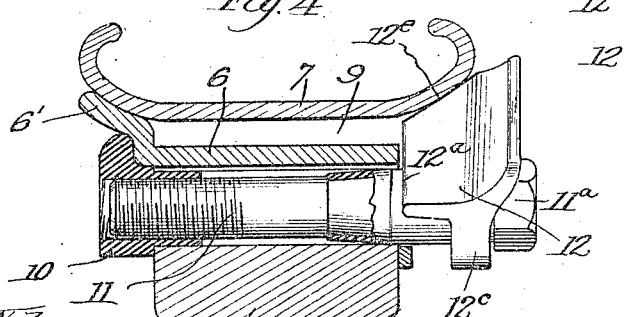

ERLE K. BAKER, OF CHICAGO, ILLINOIS, ASSIGNOR TO UNIVERSAL RIM COMPANY, OF CHICAGO, ILLINOIS, A CORPORATION OF ILLINOIS.

PNEUMATIC-TIRE MOUNTING.

1,155,394.　　　Specification of Letters Patent.　　Patented Oct. 5, 1915.

Original application filed July 3, 1911, Serial No. 636,693. Divided and this application filed July 19, 1911. Serial No. 639,393.

*To all whom it may concern:*

Be it known that I, ERLE K. BAKER, a citizen of the United States, and a resident of Chicago, Cook county, Illinois, have invented certain new and useful Improvements in Pneumatic-Tire Mountings, of which the following is a full, true, clear, and exact description, such as will enable others skilled in the art to make and use the same.

My invention relates to improvements in automobile wheels having demountable rims, and has special reference to improvements in the wedging and clamping devices commonly known as wedge lugs which are used for securing the rims upon such wheels.

This application is concerned with a formation or construction of the wedge lugs by which the latter are freed from the rim and allowed to turn out of contact therewith and away therefrom as soon as the point or end of the wedge portion of the lug leaves the edge of the wheel felly. The remainder of the structure herein shown and described is not claimed in this application but is both described and claimed in my earlier application Serial No. 636,693, filed July 3rd, 1911, of which this application is a division.

My invention is disclosed in and will be most readily understood upon reference to the accompanying drawings which form part of this specification, and in which:—

Figure 1 shows the outer side of an automobile wheel, rim and tire equipped with rim clamping and wedging devices, *i. e.* wedge lugs, embodying my invention. Fig. 2 is an enlarged transverse section of the wheel felly, felly band and a rim of ordinary form together with my novel clamping and wedging device in a preferred form. Fig. 3 is a plan view of the parts shown in Fig. 2, a portion of the rim being broken away to disclose my novel wedge lug. Fig. 4 is a sectional view similar to Fig. 2 showing the wedge lug at the moment it is freed from the felly and in the act of turning away from the rim. Fig. 5 is a perspective view of the wedge lug.

The automobile wheel as shown in the drawings comprises a hub 3, spokes 4, a felly 5 and the metal felly band 6. An ordinary rim 7 for a pneumatic tire 8 is shown. On the inner side, meaning toward the body of the automobile, the felly band 6 has the usual annular flange 6' to receive the rim. The rim is larger than the felly band and there is a gap or annular space 9 between the two, in which the wedge lugs work. There are several of these lugs spaced around the wheel as shown in Fig. 1. They serve to support, center and fix the rim upon the wheel.

At points A in Fig. 1 the wedge lugs are shown in working position. At point B the wedge lug is shown at the moment of disengagement from the rim, and at point C the wedge lug is shown swung down or inwardly out of the path of the rim, as at moments when the rim is being placed upon or removed from the wheel. In preferred form each of these devices comprises three principal parts, to wit a threaded nut 10 fastened to the back or inner side of the felly, a straight threaded bolt 11 which extends through a transverse hole in the felly beneath the band 6 and which works in the nut 10. The third part is the wedge lug 12 confined between the head $11^a$ of the bolt and a shoulder $11^b$ on the bolt. By this arrangement the wedge lug is made movable in both directions with the bolt so that the latter is employed to drive the wedge portion $12^a$ of the wedge lug between the felly band and the rim to clamp the rim on the wheel and is also used as a means for positively withdrawing the wedge lug when it is desired to detach the rim.

As shown at $12^b$ in Fig. 2 and in Fig. 5 the shank $12^c$ of the wedge lug contains a hole or slot which is larger than the bolt, allowing the wedge lug such freedom of movement with respect to the bolt that it may adjust itself to the rim and felly band without side strains on the bolt.

D represents a socket wrench which fits the bolt head, and which is ordinarily used for turning the bolt to operate the clamping device. The wedge portion of the wedge lug is wide and flat, extending a considerable distance on both sides of the bolt so that the radial distance from the bolt to the ends or corners of the wedge portion is greater than the medial or shortest radius of the lug. While from the sectional view of the device it would appear that the lug might be turned down out of the way of the rim as soon as drawn back far enough for the end $12^d$ of the wedge to escape the edge of the felly band, this has not been the case with such wedge lugs in the past and would not in this present instance be true were it not for the peculiar manner in which I form or construct the wedge portion of the wedge lug. The rim being wider than the felly of the wheel overhangs the same, and if the wedge lug were symmetrical in formation the ends or corners of the lug would still remain in contact with the rim after being freed from the felly. As the rim cannot be removed until the wedge lug is taken out of its path it would thus be necessary to loosen or slack off the lug far enough to carry the whole lug beyond the rim. Such a construction would involve an objectionably long bolt or the entire removal of the part holding the lug and would also involve an unnecessarily protracted operation in the placing and replacing of the rim. To avoid this difficulty I eccentrically offset the wedging portion with respect to the projected axis of the bolt hole in the shank and the medial radial plane which includes said axis. Thus, as here shown, I cut off or bevel one corner or end of the wedge as shown at $12^e$. The angle begins virtually at the middle of the wedge point $12^d$ and ends at the juncture of the wedge and shank portions. Thus one end of the lug is cut away and made to conform to and escape the overhanging rim from the moment that the point of the wedge is moved back out of contact with the felly band. This action is clearly disclosed in Fig. 4. In consequence the outward turning of the lug holding member (in this case the bolt) results in automatically turning the wedge lug out of contact with and out of the path of the rim as soon as the lug is backed off the short distance required to free it from the felly. In practice the lug when turned down in this way is thus left on the bolt until the rim is ready to fasten again whereupon the first turning of the bolt results in throwing the wedge around into locking position in readiness to enter the gap or space between the rim and felly. Obviously this invention renders the whole clamping device compact and practical to the extent of enabling the use of smaller parts than usual and permitting them to remain on the wheel instead of being removed with the lug in the ordinary manner.

It will at once be apparent that this invention is of distinct utility with clamping arrangements of other forms than herein shown.

Having thus described my invention I claim as new and desire to secure by Letters Patent:

The herein described improvement comprising a demountable-rim wedge-lug composed of a shank portion having a bolt hole and a unitary wedge portion substantially parallel with the projected axis of said hole and eccentrically offset with respect thereto, for the purpose specified.

In testimony whereof, I have hereunto set my hand, this 12th day of July, 1911, in the presence of two subscribing witnesses.

ERLE K. BAKER.

Witnesses:
EDWARD F. WILSON,
JOHN R. LEFEVRE.